Figure 1:
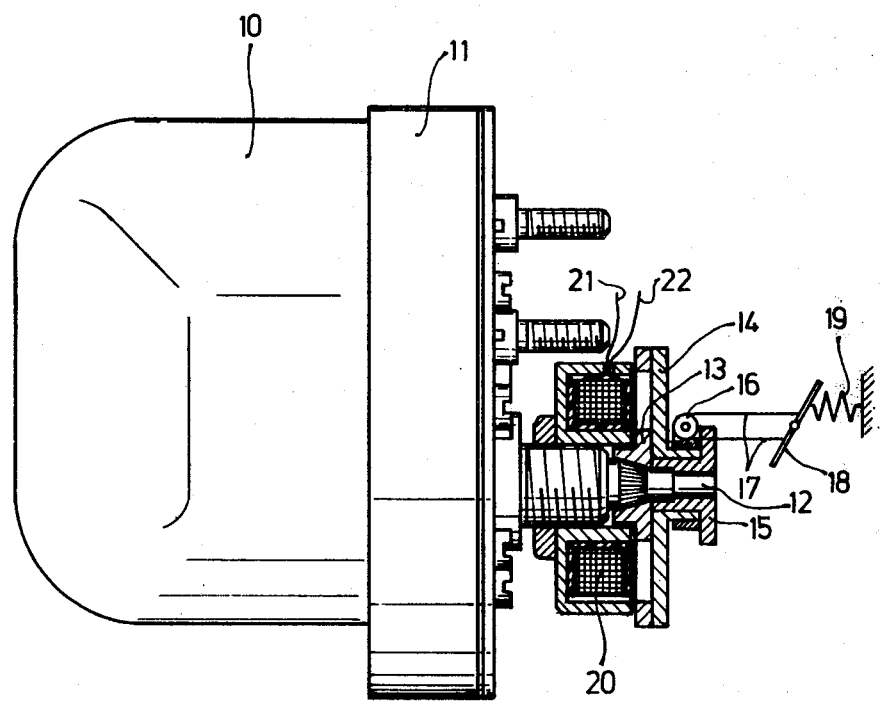

United States Patent

Hertfelder

[11] 4,163,432
[45] Aug. 7, 1979

[54] ELECTRICALLY MOTOR DRIVEN AND DECLUTCHABLE POSITIONING DEVICE FOR A MECHANICAL CONTROL

[75] Inventor: Wilhelm Hertfelder, Steinenbronn, Fed. Rep. of Germany

[73] Assignee: Robert Bosch GmbH, Stuttgart, Fed. Rep. of Germany

[21] Appl. No.: 822,522

[22] Filed: Aug. 8, 1977

[30] Foreign Application Priority Data

Aug. 18, 1976 [DE] Fed. Rep. of Germany ....... 2637122

[51] Int. Cl.² .............................................. F02N 17/00
[52] U.S. Cl. ........................................ 123/102; 74/740
[58] Field of Search ............................ 123/102; 74/740

[56] References Cited

U.S. PATENT DOCUMENTS

| | | | |
|---|---|---|---|
| 2,476,652 | 7/1949 | Black | 123/102 |
| 2,985,036 | 5/1961 | Förster | 74/740 |
| 3,099,330 | 7/1963 | von Berg et al. | 123/102 |
| 3,547,216 | 12/1970 | Marie | 123/102 |
| 3,809,034 | 5/1974 | Durichen | 123/102 |
| 3,885,644 | 5/1975 | Seidler et al. | 123/102 |
| 3,983,767 | 10/1976 | Lefeuvre | 123/102 |

Primary Examiner—Charles J. Myhre
Assistant Examiner—R. A. Nelli
Attorney, Agent, or Firm—Frishauf, Holtz, Goodman & Woodward

[57] ABSTRACT

An electric motor with output reduction gearing such as is provided for windshield wipers, is operated in response to a vehicle speed control system and is coupled through an electromagnetically operated clutch to a worm gear drive providing further reduction gearing that controls the accelerator pedal of a vehicle engine through a cable drum and a cable connection. When the electromagnetic clutch is released the compression spring of the accelerator pedal restores the latter and the drum and worm gear connected thereto to the engine-idling position. A resistance strip on the driven clutch member is sensed by a wiper contact to indicate or check on the position of the accelerator control and components moveable therewith.

7 Claims, 2 Drawing Figures

ELECTRICALLY MOTOR DRIVEN AND DECLUTCHABLE POSITIONING DEVICE FOR A MECHANICAL CONTROL

This invention concerns an electrically motor-driven positioning mechanism for a mechanical control that has a considerable scope of movement and requires a relatively large positioning force over the movement range, as in the case of the accelerator control of the usual kinds of internal combustion engines. More particularly the invention concerns a positioning device arranged so that the mechanical control will return into its rest position automatically and as quickly as possible when the device is switched off.

Electrically operated positioning controls are particularly desirable in automatic speed controls for motor vehicles. It has been known heretofore to position a mechanical control such as the accelerator lever of an internal combustion engine by means of a solenoid that pulls in an armature when an operating voltage is applied to the winding of the solenoid. The disadvantage of such solenoid controls is that they cannot practically provide a relatively long stroke and a strong positioning force at the same time. It is an object of the present invention to overcome this disadvantage by providing an electrically driven positioning device for a mechanical control such as the accelerator lever of an internal combustion engine which will exert a strong positioning force over the full operating path of the mechanical control and will also allow the mechanical control to return promptly to its rest position when the positioning device is de-energized.

SUMMARY OF THE INVENTION

Briefly, an electric motor operating through first reduction gearing drives an electromechanically engageable and releaseable clutch coupling having a first member affixed to the output shaft of the first reduction gearing and having a second member operatively connected through second reduction gearing with the mechanical control to be positioned and, furthermore, mechanical position restoring means, preferably a simple restoring spring, are provided for automatically restoring the mechanical control to the usual rest position, which is commonly the idling engine speed position, when the clutch coupling is released.

In one form of device according to the invention, the first member of the clutch coupling is a disk driven by the first reduction gearing and the second member is equipped with a sinuous annular leaf spring urging it away from the first member, while an electromagnet mounted coaxially with the drive shaft is provided for pressing the second coupling member into force transmitting engagement with the first coupling member against the force of the spring when the electromagnet is energized. Preferably the disk constituting the first member is provided with crown gear teeth in this embodiment and the second member is a gear of such form that the crown gear teeth fit into the interstices of the other gear teeth following energization of the electromagnet. In this embodiment the electromagnet is preferably mounted so as to be rotatable with the first member of the coupling and slip rings and slip contacts are provided in its energizing circuit.

In another embodiment of the device according to the invention, the first coupling member is a perforated disk and the second coupling member is a clutch flange, while a gear coaxial with the drive shaft of the first reduction gearing but not fixed thereon is attached to the clutch flange. An electromagnet is provided in fixed position in that embodiment, again coaxial with the drive shaft, and operates when energized to cause the clutch flange to press against the perforated disk and thus provide force transmission from the drive shaft to the gear to which the clutch flange is attached.

In the case of both embodiments above mentioned, it is preferred that the second member of the clutch coupling be provided with gear teeth capable of driving a worm and that a worm be set in engagement with the second coupling member to provide the second reduction gearing and, furthermore to rotate a cable drum operatively connected to the mechanical control to be positioned by means of a cable drive. It is also preferred in the case of both embodiments above mentioned to provide an electrical resistance path on the second member of the clutch coupling and also a slip contact mounted in a fixed position in which it is slidably engaged with the resistance path so as to make possible the determination of the rotary angle position of the second coupling member by a suitable electric circuit. The invention is further described by way of illustrative embodiments with reference to the annexed drawings, in which:

FIG. 1 is a side elevation, partly in section and partly diagrammatic, of a first embodiment of positioning device according to the invention, namely the second of the embodiments mentioned above, and FIG. 2 is a cross-section passing through the axis of the drive shaft of the first reduction gearing of a portion of the second embodiment of positioning device according to the invention, the one first mentioned above, showing the portion thereof including the clutch coupling and the worm gearing.

The embodiment shown in FIG. 1 is a positioning device designed for use in a speed control system for a motor vehicle. Such speed control systems operate to control the vehicle's speed to maintain it constant. For this purpose an accelerator lever of the engine, in the illustrated case the usual gas pedal, is brought into a particular position and is shifted as required in response to the output signal of a speed control regulator. If now the driver of the vehicle operates the clutch pedal of the vehicle to shift gears, it is necessary that the positioning device should allow the accelerator control to return to its idling position, since the sudden removal of the load would otherwise cause the motor speed to run up sharply to a level that should not be permitted. The fastest possible automatic resetting to the idling position upon disengagement of the clutch is an important requirement for the positioning device along with the requirement of a high positioning force over a large control range.

The device shown in FIG. 1 includes an electric motor 10 having a built-in reduction gear 11. The illustrated motor gearing is of the kind commonly used, for example, for driving windshield wipers. A perforated disk 13 is mounted on the output drive shaft of the reduction gearing so that it turns with that drive shaft. A clutch flange 14 fixed to a worm gear 15 is disposed facing the perforated disk 13 and coaxial with the latter as well as with the drive shaft 12. The worm gear 15 has teeth suitable for driving a worm 15 on the shaft of which a cable drum (not shown) is affixed that operates the accelerator pedal 18 of an internal combustion engine by means of the double-acting cable run 17. The accelerator pedal 18 is subject to the pressure of the compression spring 19.

The clutch composed of the perforated disk 13 and the clutch flange 14 is operated by an electromagnet having a winding 20, mounted in a fixed position coaxial with the drive shaft 12 and supplied with operating voltage through the conductors 21 and 22. When the winding 20 is not excited, the perforated disk 13 is separated from the clutch flange 14, for example by means of a wavy annular spring, not shown in the drawing, operating on the clutch flange 14. When operating voltage is applied to the winding 20, however, the clutch flange 14 is pulled against the perforated disk 13 and caused to be rotated by the latter. The rotary movement is then transmitted through the worm-driving gear 15 to the worm 16 which positions the accelerator pedal 18 by the cable run 17 and the cable drum not shown in the drawing. If the operating voltage of the winding 20 is switched off, for example upon declutching of the engine, its energizing current disappears and with it its magnetic force, so that the perforated disk 13 and the clutch flange 14 become separated and the compression spring 19 presses the accelerator pedal 18 back into its idling position, at the same time causing, by means of the cable run 17, the worm 16 and the worm gear 15, as well as the clutch flange 14 to go back into their corresponding rest or zero positions.

Figure 2:
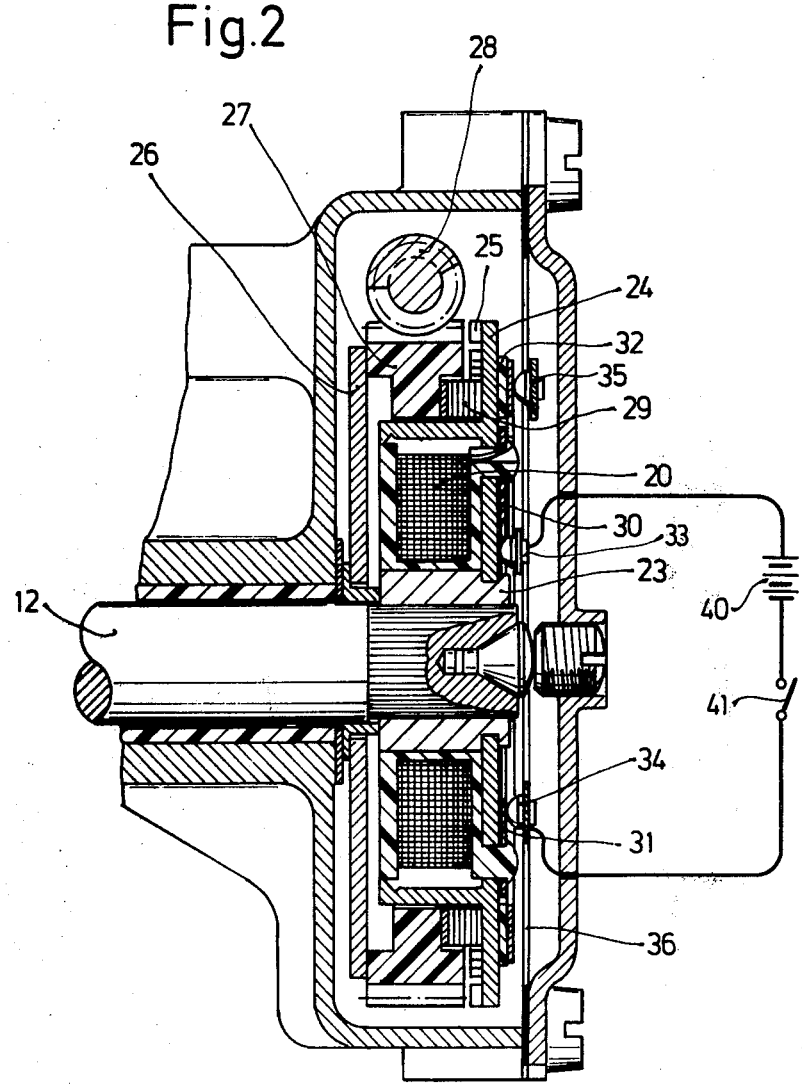

Another illustrative embodiment of an electromagnetic clutch forming part of a positioning device according to the invention, mounted on the output side of the same kind of motor-driven reduction gearing, is shown in FIG. 2. In this case a hub 23 is fixed on the end of the drive shaft 12 and a clutch disk 24 is firmly affixed on the hub 23. The clutch disk 24 in this case has crown-gear teeth 25. Also mounted on the hub 23 is the electromagnet coil 20, which is accordingly rotatable with the clutch disk 24. An armature disk 26 and a worm gear 27 affixed thereto are arranged concentrically with respect to the drive shaft 12 of the reduction gearing 11 and this combination is in driving connection with a worm 28 and is operatively connected with a cable drum, a cable drive and the accelerator pedal 18, neither of which last are shown in this figure of the drawing. A sinuous annular disk spring 29 of the kind already mentioned but not shown in FIG. 1 is inserted between the clutch disk 24 and the worm gear 27 so as to press apart from each other the two members of the clutch coupling.

On the face of the clutch disk 24 facing away from the gear teeth 25 slip rings 30 and 31 are provided for supplying current to the coil 20. The operating voltage for the coil 20 is supplied to the coil 20 by slip contacts 33 and 34 that slide on the slip rings 30 and 31 respectively and are connected in circuit with a voltage source 40 and a control switch 41 (that may for example be operated by the engine clutch pedal that is not shown). A third slider contact 35 is also provided to make contact with a resistance path 32 in order to sense continuously the position of the clutch disk 24 hence necessarily the position of the accelerator pedal 18. The slip rings 30 and 31 and the resistance path 32 and their respective sliding contacts, as well as all of the gearing and clutch parts are protected against damage from dirt by a seal gasket 36.

The positioning device clutch just described operates as follows. While the coil 20 is disconnected from the operating voltage the spring 29 presses the two clutch components 24 and 27 apart. In this condition the compression spring 19 operates to put the accelerator pedal 18, the cable run 17 and the worm gear 27 in their respective idling or rest positions. If now a voltage is applied to the coil 20, the armature disk 26 together with the worm gear 27 are pulled against the clutch disk 24 in opposition to the force of the wavy annular disk spring 29 and the crown gearing 25 of the clutch disk grips into the interstices between the teeth of the worm gear 27. There is thus produced a force-transmitting connection between the clutch disk 24 and the worm gear 27. The rotation of the drive shaft 12 of the reduction gearing 11 is then transmitted to the cable drum 16 (FIG. 1) to operate the accelerator pedal 18 and as the latter is positioned by the drive shaft, this position can be sensed from a suitable circuit (not shown) by means of the slider 35 and the resistance strip 32.

If for example upon declutching of the engine the coil 20 is cut off from its operating voltage (by the switch 41), the wavy annular spring 29 presses apart the worm gear 27 and the clutch disk 24 and then the compression spring 19 presses the accelerator pedal 18 and also the worm gear 27 into their respective idling or rest positions. The particular advantage of the embodiments above described is that upon separation of the members of the electromagnetically controlled clutch, the mechanical control to be positioned, in the present case the accelerator pedal of internal combustion engine, automatically goes back into its idling or rest position and yet the positioning device can apply a large positioning force over a relatively large control path.

Although the invention has been described with respect to particular illustrative embodiments, it is evident that modifications and variations are possible within the inventive concept.

I claim:

1. An electrically motor-driven positioning device for the accelerator lever of an internal combustion engine for use in a vehicle speed servo control sysem, comprising in combination:
    a reversible electric motor having a motor shaft; first reduction gearing (10) connected to said motor shaft for operation by said electric motor and having an output drive shaft (12);
    an electromechanically engageable and releasable clutch coupling having a first member constituted by clutch disk (24) affixed to said output drive shaft (12) of said first reduction gearing (10), a second member (27) in mechanically operative connection, through a second reduction gearing (28), with said accelerator lever (18), and spring means (29) for urging said second member away from first member, said mechanically operative connection being capable of positioning said accelerator pedal independently of the other forces so long as said clutch coupling is engaged;
    an electromagnet (20) for pressing said second coupling member (27) into force-transmitting engagement with said first coupling member (24) against the force of said spring (29) when said electromagnet is energized, and
    mechanical position restoring means for automatically restoring said mechanical control to a predetermined rest position when said coupling is released.

2. A positioning device for a control as defined in claim 1, in which said electromagnet is mounted coaxially with said drive shaft (12) and in which said spring means (29) are constituted by a sinuous annular leaf spring.

3. A positioning device for a control as defined in claim 2 in which said clutch disk (24) is provided with crown-gear teeth (25) and said second coupling member (27) is a toothed gear of such form that said crown-gear teeth fit into the interstices of the gear teeth of said second member following energization of said electromagnet (20).

4. A positioning device for a control as defined in claim 2 in which:
said electromagnet (20) is mounted so as to be rotatable with said clutch disk (24), and
slip rings (30,31) and slip contacts (37,34) connected to a voltage supply source through a magnet control switch are provided for supplying current to said electromagnet.

5. An electrically motor-driven positioning device for the accelerator lever of an internal combustion engine, for use in a vehicle speed servo control system, comprising in combination:
a reversible electric motor having a motor shaft;
first reduction gearing (10) connected to said motor shaft for operation by said electric motor and having an output drive shaft (12);
an electromechanically engageable and releasable clutch coupling having a first member in the form of a perforated disk (13) affixed to said output drive shaft (12) of said first reduction gearing (10), a second member in the form of a clutch flange (14) and an electromagnet (20) provided in fixed position for causing said clutch flange (14) to press against said perforated disk (13) when said electromagnet is energized, and thereby provide force transmission from said drive shaft to said clutch flange,
second reduction gearing (15,16) including a gear (15) attached to said clutch flange (14) and coaxial with said drive shaft (12) of said first reduction gearing but not fixed thereon, and having mechanical actuating means for positioning said accelerator lever (18) independently of other forces so long as said clutch coupling is engaged, and
mechanical position restoring means for automatically restoring said mechanical control to a predetermined rest position when said coupling is released.

6. A positioning device for a control as defined in claim 5, in which
said electromagnet is coaxial with said drive shaft;
a worm (16) is provided in engagement with said clutch flange (14) to constitute thereby and therewith said second reduction gearing;
said clutch flange (14) is provided with worm gear teeth for thereby driving said worm (16), and
a cable drum rotatably connected to said worm is provided which is operatively connected to said accelerator lever (18) by means of a cable drive.

7. A positioning device for a control as defined in claim 1 in which an annular electrical resistance strip (32) is provided on said second coupling member (24) and a slip contact (35) mounted in a fixed position in which it is slidably engaged with said resistance strip, is provided for making possible the detection of the rotary angle position of said second coupling member.

* * * * *